US007765254B2

(12) United States Patent
Hariharan et al.

(10) Patent No.: US 7,765,254 B2
(45) Date of Patent: Jul. 27, 2010

(54) INTEGRATION OF LEGACY APPLICATIONS

(75) Inventors: Rajaraman Hariharan, Chennai (IN); Ramakrishnan Kannan, Trichirappalli (IN); Priyadarshini Sampath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1271 days.

(21) Appl. No.: 11/260,655

(22) Filed: Oct. 26, 2005

(65) Prior Publication Data

US 2007/0094372 A1    Apr. 26, 2007

(51) Int. Cl.
G06F 15/16    (2006.01)
(52) U.S. Cl. .................. 709/201; 709/202; 709/203
(58) Field of Classification Search ........... 709/201, 709/202, 203
See application file for complete search history.

(56) References Cited

U.S. PATENT DOCUMENTS

| | | | | |
|---|---|---|---|---|
| 6,542,908 | B1 * | 4/2003 | Ims ........................... | 707/204 |
| 6,757,869 | B1 * | 6/2004 | Li et al. ...................... | 715/205 |
| 6,823,358 | B1 * | 11/2004 | Spender ...................... | 709/203 |
| 2002/0019884 | A1 * | 2/2002 | Gungabeesoon ............ | 709/310 |
| 2002/0052977 | A1 | 5/2002 | Stall | |
| 2002/0069123 | A1 | 6/2002 | Soderlind et al. | |
| 2002/0178170 | A1 | 11/2002 | Britton et al. | |
| 2003/0046639 | A1 | 3/2003 | Fai et al. | |
| 2003/0063119 | A1 | 4/2003 | Bloomfield et al. | |
| 2004/0205612 | A1 * | 10/2004 | King et al. .................. | 715/522 |
| 2005/0172263 | A1 | 8/2005 | Hariharan et al. | |

FOREIGN PATENT DOCUMENTS

WO    WO 0133387    5/2001

OTHER PUBLICATIONS

Medjahed, B., Benatallah, B., Bouguettaya, A., Ngu, A.H.H., Elmagarmin, A.K., "Business-to-business interactions: issues and enabling technologies", The International Journal on Very Large Data Bases, May 2003, pp. 59-85, vol. 12, Issue 1,Springer-Verlag, New York, USA.
Mondal, S. A., Gupta, K. D, "Choosing a Middleware for Web-Integration of a Legacy Application", Software Engineering Notes, May 2000, vol. 25 No. 3, pp. 50-53, ACM Press, New York, USA.
Inspec: AN 6247757, Abstract only, No. C1999-06-615N-103, Strategies for Legacy Integration, T. Mulcahy, Enterprise Middleware, p. 25-33, Apr. 1999.

(Continued)

*Primary Examiner*—Joon H Hwang
*Assistant Examiner*—Chau D Le
(74) *Attorney, Agent, or Firm*—Anthony V. S. England; William H. Steinberg

(57) ABSTRACT

A method and apparatus are disclosed for integrating an legacy application hosted on an application server onto a network, such as the Internet. This allows one or more remote computers to access the legacy application over the network. The disclosed method and apparatus do not require changes to be made to the legacy application, due to the fact that the legacy application is accessed using messages in the form produced by the native operating system.

18 Claims, 5 Drawing Sheets

OTHER PUBLICATIONS

Inspec: AN 5856512, Abstract only, No. B9804-6210C-018, C9804-7410F-028, "Experience with the Integration of a Legacy Management System into a TMN Environment", A. Bedoyan et al., 1998 IEEE Network Operations and Management Symposium, Conference Proceedings, p. 220-9 vol. 1, 1998.

Inspec: AN 7039472, Abstract only, B2001-10-6210L-256, C2001-10-6150N-130, Legacy Connection [Host Integration Server 2000], K. Ewbank, Developer Network Journal, No. 25, p. 34-8, Jul.-Aug. 2001.

* cited by examiner

| Remote computer | Network server | Application server |
|---|---|---|
| Send request to legacy application | | |
| 305 | • Launch instance of integration object.<br>• Send request to Application server to launch legacy application — 310<br>315 | |
| | 320 | Launch legacy application. and return process ID |
| | Send 1st form info to remote computer — 325 | |
| Display 1st form using web browser — 330 | | |
| • Receive values<br>• Submit form — 335 | | |
| | • Identifies macro corresponding to form<br>• Extract values, create and send message to application server — 340 | |
| | 345 | Convert and post message to legacy application |
| | 350<br>355 | • Read info from legacy application screen and identify screen from dialog ID<br>• Pass dialog ID and relevant data to network server |
| 360 | • Identifies new form from dialog ID<br>• Sends form info with data to remote computer | |
| Display form using web browser — 365 | | |
| .... | .... & so on | ... |

Fig. 3

INTEGRATION OF LEGACY APPLICATIONS

FIELD OF THE INVENTION

The present invention relates generally to the field of computer software applications and, in particular, to accessing legacy applications over a computer network, such as the Internet.

BACKGROUND OF THE INVENTION

Legacy applications are applications that typically have been inherited from languages, platforms, and/or techniques earlier than the current Internet-based technology. Most enterprises have legacy applications, and associated legacy databases, that still today serve critical business needs. Regardless of the fact that such applications are often large, monolithic, and difficult to modify, they continue to be used. Generally it is due to the cost associated with replacing or redesigning the applications, and often despite their poor competitiveness and compatibility with modern equivalents.

There are many advantages to migrating the operation of a business to a distributed system. Often the Internet is used as the preferred network linking the distributed system. However, legacy applications were not developed for Internet-based communication in mind. Legacy applications were developed to execute on stand alone systems, which may be deployed in a multi-user environment, like a terminal server. Their continued use restricts enterprises from joining the e-commerce world, in which business is conducted over the Internet.

One obvious solution is to rewrite the legacy application in a modern development language and in a manner that complies with more recently developed Internet programming models. However, rewriting involves formidable costs and risks, especially when such applications share common data. Also, legacy applications typically have business logic and interface logic intermixed. Dividing out the business logic from the interface logic is often a formidable task.

Also, the databases used by legacy applications contain data accessible in a format not normally suited for Internet applications. Thus, there is a need to address the difficulty of using legacy applications with newer technology.

US Patent Publication 2002/0178170 A1 discloses a system wherein such databases are retained, and an interface or "connector" is provided for each database for converting data between a hierarchical or multi-valued simple data structure used for the legacy database and a rich data structure used for Internet databases.

US Patent Publication 2003/0046639 A1 discloses a single platform system for facilitating creation, exchange, presentation and management of documents, a collection of data that may be in any format or form, to support business transactions. The single platform system also links to, and integrates, legacy systems, messaging gateways, and other enterprise information systems.

In the article entitled "Choosing a Middleware for Web-Integration of a Legacy Application" published in Software Engineering Notes vol 25 no 3, pages 50-53, middleware is used as a platform to support integration of a legacy application running on mainframe and a web-server. Hence a three-tier client server architecture is created.

A method and system for integrating legacy applications into a platform independent environment are disclosed in U.S. patent application Ser. No. 10/769,435, filed on Jan. 30, 2004, in which a portable executable (PE) is invoked through a platform-independent interface by processing an export table in the PE to obtain the function names used in the PE. A resources table in the PE is processed to obtain a user interface used in the PE. A platform-independent user interface is generated based on the user interface used in the PE. At least one of the functions used in the PE is invoked through the platform-independent user interface.

SUMMARY OF THE INVENTION

The foregoing need is addressed in the present invention. In one form of the invention, a method for communicating with an application includes receiving, by a user agent on a user computer, a user request for an application via an application layer protocol. The application is not sufficiently operable via an application layer protocol to directly interact effectively over a network. The user agent submits a request for the application to a intermediary computer. The intermediary computer responsively requests the application and a host computer launches an instance of the application responsive to the request from the intermediary computer. Also, the intermediary computer retrieves a first form for the user agent, wherein the first form emulates a first screen of the application. The user agent renders the first form and receives user input via an application layer protocol for the first form. Also, the user agent submits data for the form, including the user input, to the intermediary computer. The host computer posts a message to the instance of the application responsive to information extracted by the intermediary computer from the received form data. The posted message includes the user input and is in an operating system message format such that the message appears to the application as if the message is responsive to a hardware input event.

In another aspect, the launching creates a process identifier for the instance of the application and the posting of the message is responsive to the process identifier.

Also, the request to the intermediary computer includes a dialog identifier, and the retrieving of the first form by the intermediary computer is responsive to the dialog identifier.

In a still further aspect, the intermediary computer associates the process identifier and the dialog identifier, wherein the information extracted from the received form data by the intermediary computer includes the user input and the dialog identifier. The intermediary computer sends the user input and the process identifier to the host computer responsive to the association of the process identifier and the dialog identifier.

Additionally, or in a variation, the intermediary computer associates the process identifier and an input field tag of the first form, wherein the information extracted from the received form data by the intermediary computer includes the user input and the input field tag. The intermediary computer sends the user input and the process identifier to the host computer responsive to the association of the process identifier and the input field tag.

In yet another aspect, the host computer sends the process identifier and data from the application to the intermediary computer and the intermediary computer sends the first form and the data from the application to the user computer.

In one aspect, the first form is in a markup language format.

In another form, a system for communicating with an application includes a user agent on a user computer and an intermediary computer. The user agent is operable to receive a user request for an application via an application layer protocol and responsively submit a request to the intermediary computer. The application is not sufficiently operable via an application layer protocol to interact effectively over a network. A host computer is operable to launch an instance of the application responsive to a request from the intermediary computer. The intermediary computer has an integration object for retrieving a first form for the user agent, the first form emulating a first screen of the application. The user agent is operable for rendering the first form, receiving user input via an application layer protocol for the first form and submitting data for the form to the intermediary computer, wherein the data includes the user input. The host computer has a message manager for posting a message to the instance of the application responsive to information extracted from the received form data by a macro manager of the integration object. The posted message includes the user input and is in an operating system message format such that the message appears to the application as if the message is responsive to a hardware input event.

In another aspect, the intermediary computer includes a message constructor operable to send the user input and the process identifier to the host computer responsive to the association of the process identifier and the dialog identifier.

In addition, or alternatively, the message constructor is operable to send the user input and the process identifier to the host computer responsive to the association of the process identifier and the input field tag.

Other variations, objects, advantages and forms of the invention will become apparent upon reading the following detailed description and upon reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment read in conjunction with the accompanying drawings.

FIG. 3 shows a sequence diagram of the steps performed during typical operation of the software system.

DETAILED DESCRIPTION OF THE INVENTION

Figure 1:
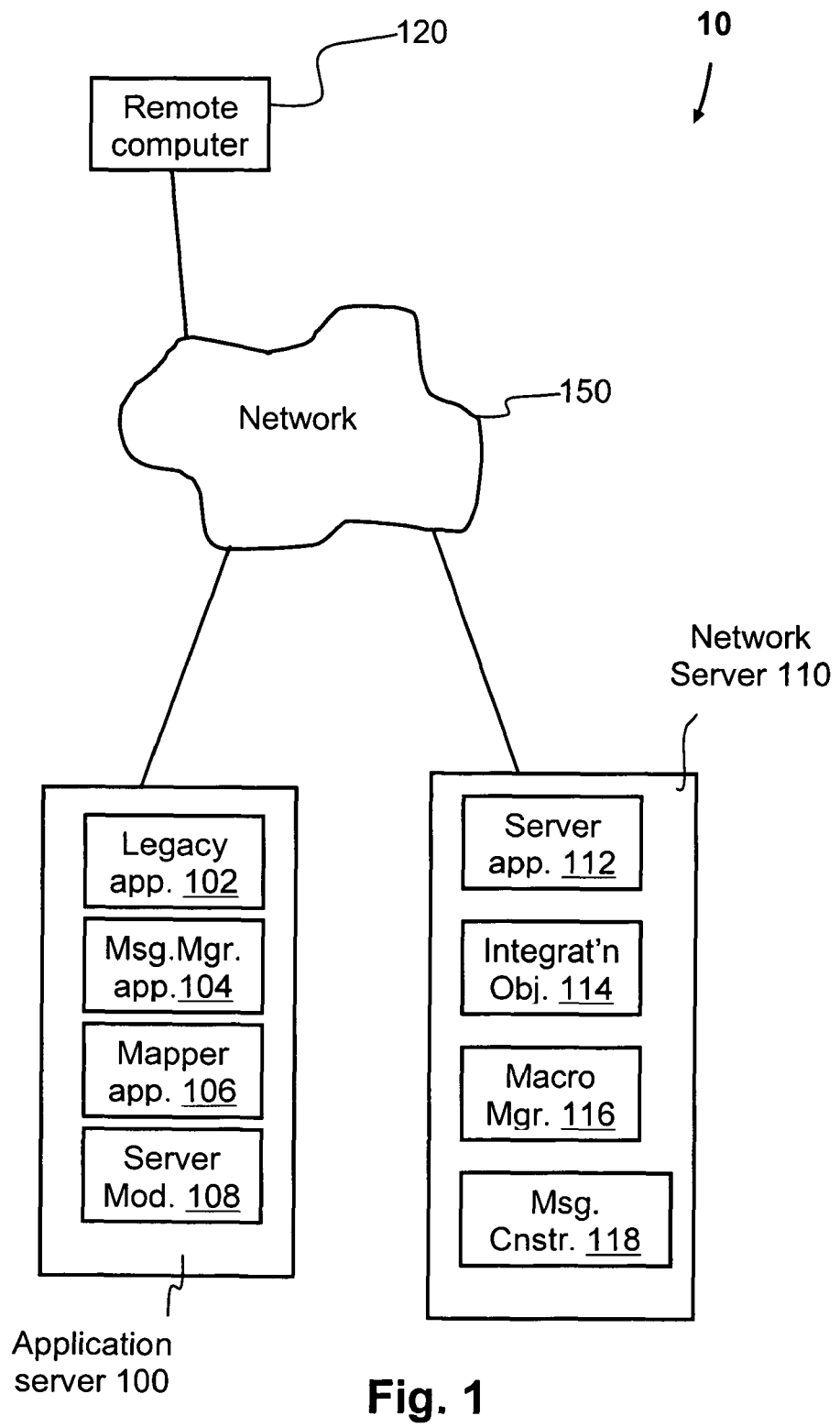
FIG. 1 shows a software system upon which an embodiment of the present invention may be practiced.

In the following detailed description of the preferred embodiments, reference is made to the accompanying drawings illustrating embodiments in which the invention may be practiced. It should be understood that other embodiments may be utilized and changes may be made without departing from the scope of the present invention. The drawings and detailed description thereof are not intended to limit the invention to the particular form disclosed, but on the contrary, the intention is to cover all modifications, equivalents and alternatives falling within the spirit and scope of the present invention as defined by the appended claims. Where reference is made in any one or more of the accompanying drawings to steps and/or features, which have the same reference numerals, those steps and/or features have for the purposes of this description the same function(s) or operation(s), unless the contrary intention appears.

FIG. 1 shows a software system 10 upon which an embodiment of the present invention may be practiced. The software system 10 includes an application server 100, a network 150, a network server 110, and at least one remote computer 120. The application server 100, the network server 110, and remote computer 120 are interconnected to the network 150. The network 150 allows communication between the application server 100, the network server 110 and the remote computer 120 in a manner known in the art.

The network 150 preferably includes the Internet, in which case the network server 110 may be an Internet server. Remote computer 120 specifies a path to the network server 110 using a Universal Resource Locator (URL) having a known syntax for defining a network connection. However, network 150 may also be a self-contained network such as an Intranet, a wide area network (WAN), or a local area network (LAN).

Figure 2:
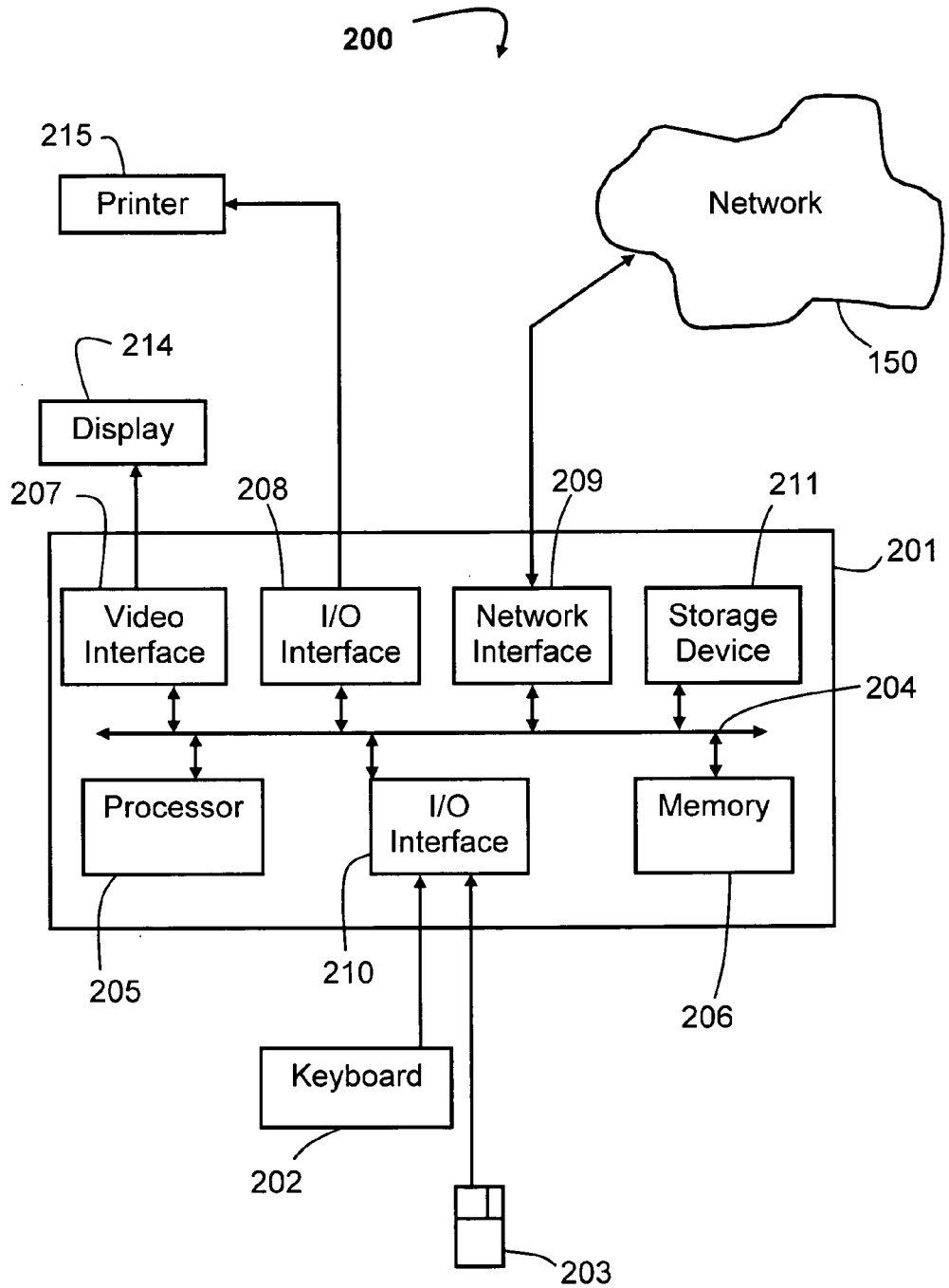
FIG. 2 shows a schematic block diagram of a server generally, which may be the application server or the network server of the software system shown in FIG. 1.

FIG. 2 shows a schematic block diagram of a general purpose computer 200, which may be the application server 100, the network server 110, or the remote computer 120. The general purpose computer 200 has a computer module 201, input devices such as a keyboard 202 and mouse 203, and output devices including a printer 215, and a display device 214.

The computer module 201 typically includes at least one processor unit 205, a memory unit 206 for storing data and programs, a storage device 211, and a number of input/output (I/O) interfaces 207 to 210. The input/output (I/O) interfaces include a video interface 207 that couples to the display device 214, an interface 208 for the printer 215, a network interface 209 used by the general purpose computer 200 for communicating to and from the network 150, and an I/O interface 210 for the keyboard 202 and mouse 203. The components 205 to 211 communicate via an interconnected bus 204.

An operating system and application programs are resident on the storage device 211 and read into memory 206 from which processor 205 controls execution of the application programs.

In the case of application server 100 (FIG. 1), the application programs include a legacy application 102, a message manager application 104, a mapper application 106 and a server module 108.

The legacy application 102 receives interactive user input, such as data and commands, by messages the operating system generates in direct response to hardware events caused by the user. That is, the legacy application 102 can not accept hardware events as inputs, but rather relies on the operating system to generate messages equivalent to the hardware events. Thus, the legacy application 102 is dependent on messages from the operating system for interacting with systems external thereto, like peripheral devices and other applications executing on application server 100.

In contrast to legacy applications, more modern, Internet-based applications are able to send and receive interactive user output and input via application protocol data units, i.e., messages in an application layer of the Open Systems Interconnect Reference Model ("OSI Model"), which is a hierarchy of layers defining requirements for communications between computers that was established by the International Standards Organization. The application layer is the top layer of the OSI model and it defines how application processes can communicate. For example, an application protocol used by an Internet-based application is the Hyper Text Transfer Protocol ("HTTP") protocol, as described in RFC2616, which is hereby incorporated herein by reference. HTTP is used to convey information, such as HTML pages, on the World Wide Web. Other examples of application layer protocols include File Transfer Protocol (FTP"), Post Office Protocol ("POP3"), Simple Mail Transfer Protocol ("SMTP"), Simple Network Management Protocol ("SNMP"), Telephone Network ("TELNET"), and Extensible Messaging and Presence Protocol ("XMPP").

An additional feature or limitation of legacy applications that are the subject of the present disclosure distinguishes them from modern, Internet-based applications. In a "console-based" legacy application, user interaction is possible by file inputs and outputs. This kind of legacy application includes, for example, UNIX and DOS based-applications. The input and output of console-based legacy applications are text based. It is relatively straightforward to interact with these applications through files, since the operating system takes care of file-based interaction through file redirection. While file interaction is not as interactive as user output and input via application protocol data units, as in Internet-based applications, nevertheless, file interaction does provide a rather straightforward communication means for interfacing a legacy application to an Internet-based application. In contrast to console-based legacy applications, however, there are also Graphical User Interface (GUI) based legacy applications. GUI-based legacy applications interact with users through rich graphics, such as button and lists, via a keyboard and pointing device, such as a mouse. A GUI-based legacy application needs to be explicitly designed during development to interact via files, or else such capability is not supported by the application. Most GUI-based legacy applications, such as, for example, Windows, MAC, and X-Motif applications, do not support input and output interaction through files, because it requires additional design, i.e., coding. The present invention is particularly relevant to legacy applications that do not support complete input and output interaction through files. This may include some console-based legacy applications, but commonly includes most GUI-based legacy applications.

A hardware event is typically triggered by a user action on a device or peripheral connected to the application server 100, such as a key press on keyboard 202. A hardware driver of the application server 100 communicates that hardware event to the operating system. The operating system in return converts the hardware event to a message including information relevant to the hardware event. In the case of the key press, the information will include which key has been pressed. Similarly, in the case where the hardware event is a depression of a button of mouse 203, the information included in the message will include the position of the pointer when the button was depressed. It is then this message that is received by the legacy application.

In the case of network server 110 (FIG. 1), the application programs include a server application 112, such as a servlet in the Java™ 2 Platform, Enterprise Edition (J2EE™), and an integration object 114, which includes a macro manager application 116 and a message constructor 118. Integration object 114 may be, for example, Beans, .Net object, or COM. The message constructor 118 is an application program interface (API) that passes data in the form of application layer messages to the legacy application 102 executing on the application server 100.

The network server 110 also has forms stored on its storage device 211. The forms are typically in a language, such as hyper-text mark-up language (HTML), Xforms etc., that is understood by a network user agent, e.g., an Internet browser, XML based clients, webservices clients, EJB clients etc. the stored forms include one form for each legacy application 102 screen. That is, each form, when rendered by the network user agent, presents a particular window or dialog on the user's display that corresponds to a screen of the legacy application.

It should be understood that in other embodiments of the invention a form can be represented in, and the browser is capable of supporting, different languages other than HTML, such as, for example Xforms, Webforms or Winforms. Server side form handling mechanisms may include JSP, Struts, Jfaces ASP, etc.

Message manager application 104, mapper application 106 and server module 108 are typically provided for installation on application server 100 on a computer readable medium. Similarly, server application 112 and integration object 114 are typically provided for installation on network server 110 on a computer readable medium. Computer readable media may be computer readable disks (magnetic or optical). Message manager application 104, mapper application 106, server module 108, the integration object 114 and server application 112 each form a computer program product, which may also be transferred to servers 100 and 110 over network 150.

In operation, remote computer 120 accesses the legacy application 102, which resides and executes on application server 100, through network 150 and network server 110. Hence, a client-server computing environment exists, with the at least one remote computer 120 being the client and application server 100 acting as the server. The software applications used by client 120 reside on application server 100, and are accessed over network 150.

Referring now to FIG. 3 in connection with FIG. 1, a sequence diagram illustrates steps performed during typical operation of software system 10. Operation starts in step 305, where remote computer 120 sends a request for access to the legacy application 102 to network server 110 via network 150 in response to a user entering a user request in a HTML document that is presented to the user on computer 120 via a network user agent, such as an Internet browser. The user request specifies the network server 110 and the legacy application 102 using appropriate location identifiers. In one embodiment of the invention, this may be by the user entering the identifiers manually. In another embodiment, the server and legacy application identifiers have been included in the HTML document by the document developer, so that the user may specify the identifiers merely by making a browser selection in the document.

In response to receipt of the request for access to the legacy application 102 by network server 110 from remote compute 120, network server 110 in step 310 launches an instance of integration object 114 resident thereon. In step 315 network server 110, and, in particular, server application 112 executing on network server 110, identifies, from the identifier in the request, the particular legacy application 102 remote computer 120 wishes to access, and sends a request to application server 100 hosting the legacy application 102 to launch the legacy application.

Operation continues in step 320, where server module 108 of application server 100 launches an instance of legacy application 102 in response to receiving the request from network server 110, which includes the identifier for legacy application 102. This launching of an instance of legacy application 102 causes the operating system of application server 100 to generate a unique process identifier (ID). Server module 108 responds to the request from network server 110 by sending the process ID of the instance of legacy application 102 to network server 110. In addition, a first screen of the legacy application may have some data populated on legacy application 102 at runtime, in which case legacy application 102 passes the data to network server 110.

In response to receipt of the process ID and the data from legacy application 102, in step 325, macro manager application 116 on network server 110 retrieves HTML code for a first form from its storage device, fills in the legacy application 102 data for the form, and sends this code with the filled in data to the browser executing on remote computer 120 for the browser to render as a form. The first form represents the first screen of the legacy application, and is presented to the user by the browser to emulate the first screen on remote computer 120.

Figure 4:
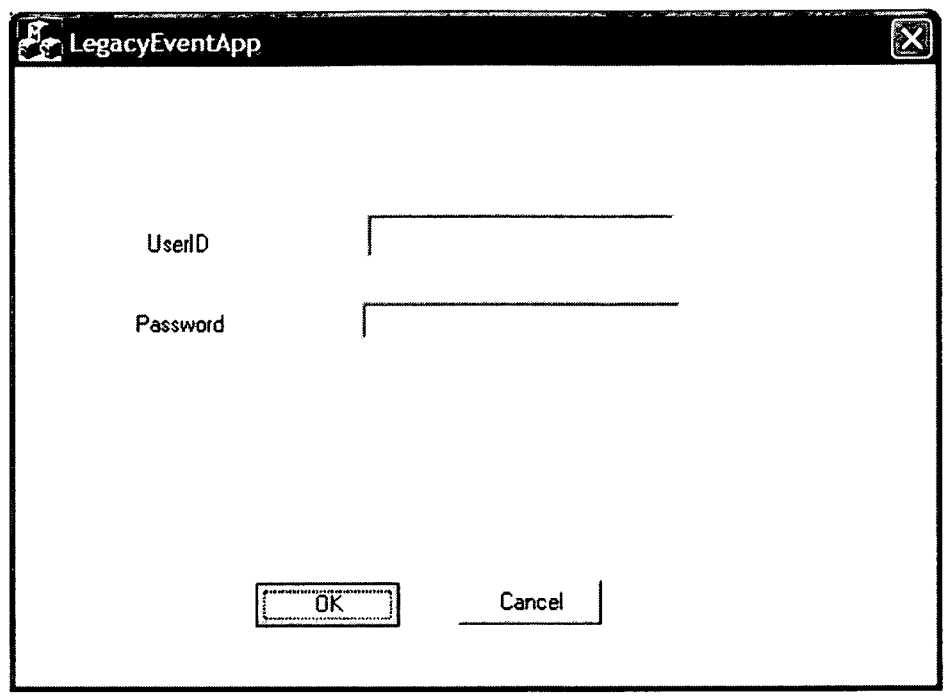
FIG. 4 illustrates a first screen of a legacy application which allows a user to log into a legacy application.
Figure 5:
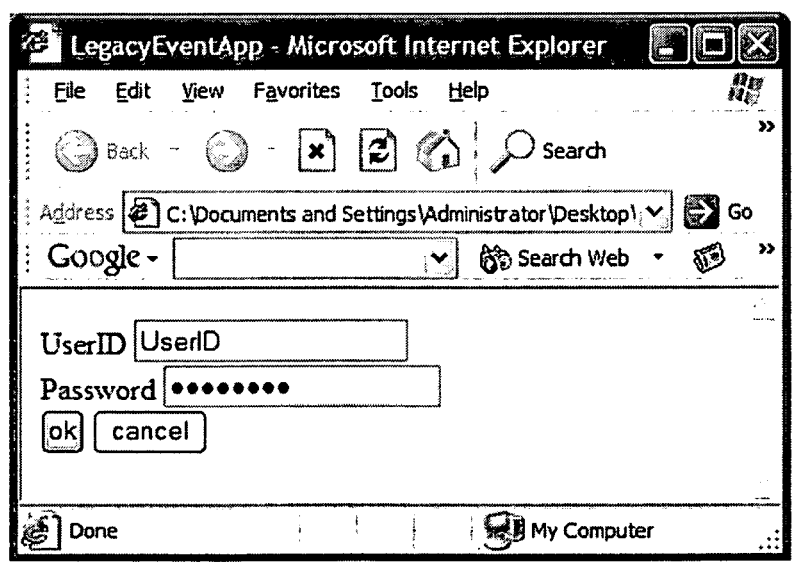
FIG. 5 illustrates an example form of the screen shown in FIG. 4.

FIG. 4 shows an example of a first screen 400 of the legacy application 102 which allows a user to log into legacy application 102. FIG. 5 shows an example first form 500 which represents screen 400 shown in FIG. 4. A browser renders the following HTML code to produce form 500:

```
<process id value = "1027">
<DialogID value = "00000056"> eg: login screen
        <HandleofWindow>2</HandleofWindow>
    <control > eg: username
            <control id> 00000002</control id>
            <event id> WM_SETTEXT </eventid> -- This is
            the message
        needs to be posted to this control id
            <value> ramki </value>
    </control >
    <control> eg: password
            <control id> 00000002 </control id>
            <event id> WM_SETTEXT </eventide>
            <value> hello </value>
    </control >
        <transition info><control id> 00000003 </control id>
            <event id>
WM_CLICKED</event id> <transition info>
</DialogID>
</process id>
```

In response to receipt of the HTML code by remote computer 120, the browser displays the first form on display device 214 of remote computer 120 in step 330. One type of form has only output fields with no input fields, such as the case where the form includes only information for the user. The user information may, for example, be "Transaction complete" or "Thank you". Another type of form has both input and output fields. The typically browser presents the output fields to provide to the user information about the preceding transaction, whereas the browser presents the input fields to allow the user to input data relating to a next transaction. Input fields may receive user-entered text, a selection from a list of alternatives, a check box, or a button such as a "Submit", "Reset" or "Cancel" button. Control buttons, such as an "OK" button or "Submit" button are associated with a control ID.

As first form 500 displayed on the display device 214 of remote computer 120 in the illustrated instance requires input, the user operating remote computer 120 responsively fills values into form 500 displayed by a browser application on display device 214 of remote computer 120, as would be the case were the user to directly access legacy application 102 on application server 100. This includes the user depressing a control button once all values have been filled in. In response, in step 335 remote computer 120 browser submits data from form 500 via HTTP over network 150 to network server 110. Conventionally, the browser packages the form data as a string, which includes the values input by the user and the input tags associated with the values. In step 340, in response to receiving the form data, a macro manager 116 of the integration object 114 on network server 110 identifies a macro corresponding to the form. Macro manager 116 provides services to integration object 114 for extracting the user-entered values, the input field tags for the respective values, and the dialog ID from the received form data.

Figure 6:
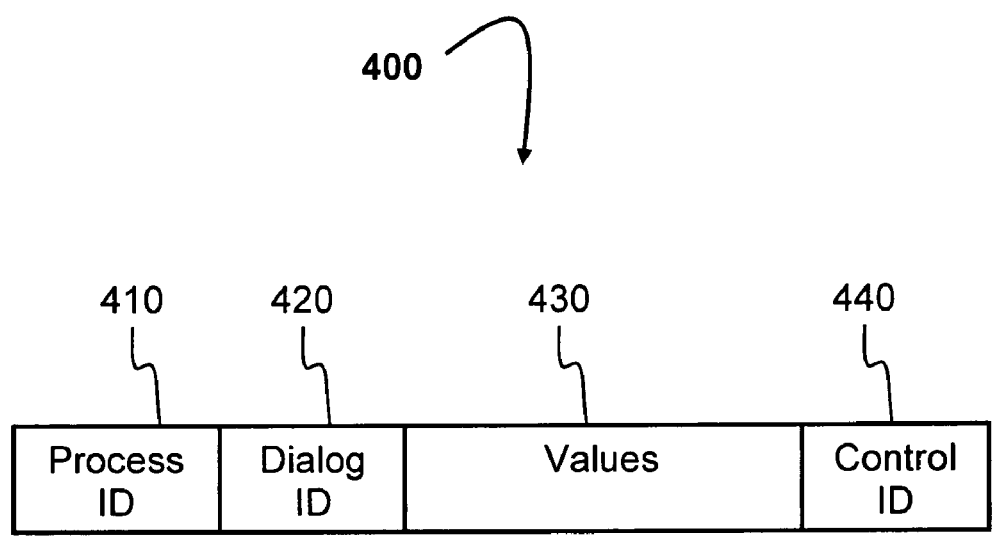
FIG. 6 illustrates the component parts of a message sent to the application server to emulate user input events.

The extracted values, process ID, and dialog ID are then passed to message constructor 118, which constructs a message containing the values for sending to launched integration object 114. FIG. 6 illustrates the component parts of message 400. Message 400 produced by message constructor 118 contains the previously mentioned process ID 410, to identify the instance of the legacy application, dialog ID 420, to identify the screen of the legacy application 102 to which values are to be inserted, user-entered values 430, and control ID 440 of any control button that the user selected when filling out the form. The constructed message is sent to application server 100.

Thus, message 400 received by application server 100 from network server 110 is intended for an instance of the legacy application, as indicated by the message's process ID 410. That instance of legacy application 102 is identified in step 345 by mapper application 106 parsing process ID 410 from message 400. The format of message 400 is also validated by mapper application 106.

Also in step 345, message manager application 104 converts message 400 received from network server 110 to a message format employed by the operating system of legacy application 102 and posts the converted message to the instance of legacy application 102 by message manager application 104. With the message converted to the operating system's message format, it appears to legacy application 102 as if the message came from the operating system in response to a hardware input event. In this manner, inputs received over network 150 are posted to the legacy application 102 by message manager 104 in the form the legacy application 102 expects to receive inputs with the assistance of the operating system's API. For example, legacy application 102 may expect to receive inputs from keyboard 202 of application server 100 on which it is executing. The inputs contained in the message posted to legacy application 102 appear to it as if the message was formed by the operating system in response to a keyboard event.

For example, in one instance the event is a keyboard event. In general, on the Microsoft Windows operating system, for example, when a user presses any key stroke, the operating system posts a keyboard message, including key down or key up, along with the required information such as what is the key pressed (a, b, c etc, 1, 2, 3, etc) and what are the status of the some keys like control, alt, shift etc. A similar keystroke event can be also be generated by an application like message manager 104 to the legacy application 102 without intervention of the operating system. This is possible because the operating system of the legacy application 102 provides API's to post messages between applications as an inter process communication mechanism. Accordingly, in an embodiment of the present invention message manager 104 and legacy application 102 use this inter process communication mechanism to post messages. Message manager 104 constructs the keystroke event message with the needed information such as the key (character to be sent) along with the status of alt, ctrl, shift keys etc. If there is a string that needs to be sent to legacy application 102, it is sent as a sequence of individual characters.

Legacy application 102 reacts to the message from message manager 104 in a manner according to the usual operation of application 102, which typically includes generating a different screen on display device 214 of application server 100. Outputs from the legacy application 102 are typically not compatible with network environments. Accordingly, outputs from the legacy application 102 have to be converted to a structure that is compatible with the network environment.

Server module 108 in step 350 then reads data from the current (new) screen in a well-known manner commonly referred to as "screen scraping" and identifies the current screen from the dialog ID. In step 355, server module 108 then passes the dialog ID to network server 110, together with output data extracted from the current screen. The dialog ID exists as part of the legacy application. Such dialog ID's are assigned as part of legacy application development.

Upon receipt of the dialog ID and output data, in step 360, the macro manager on network server 110 identifies the form that corresponds to the received dialog ID, retrieves from the storage device of network server 110 information representing the particular form, integrates the output data with the information representing that particular form, and sends to the browser executing on remote computer 120 the information representing the current screen formed by the legacy application. Upon receipt of the information representing the current screen of the legacy application 102 by remote computer 120, the browser emulates the current screen on the display device of remote computer 120 in step 365 by displaying the form with the integrated output data.

Operation then continues in a manner described above from step 335 where user inputs on remote computer 120 are communicated to the legacy application, and outputs from the legacy application 102 are communicated back to remote computer 120.

The operation of system 10 will now be described with reference to an example scenario where a user wants to check his bank account details, with the bank account details being maintained by a legacy application. The operation starts when the user on remote computer 120, and using an Internet browser, sends a request for access to a bank account legacy application 102 to network server 110.

Upon receipt of the request for access to the bank account legacy application 102 by network server 110 from remote compute 120, network server 110 launches an instance of the integration object resident thereon. The server application executing on network server 110 identifies from the request the bank account legacy application 102 remote computer 120 wishes to access, and sends a request to application server 100 hosting the legacy application 102 to launch the legacy application.

The server module on application server 100 then launches an instance of legacy application 102 and responds to the request from network server 110 by sending the process ID of the instance of legacy application 102 to network server 110, as well as information relevant to a first screen of the bank account legacy application. This is a "log-on" screen.

Upon receipt of the process ID and information relevant to the first screen, macro manager 116 on network server 110 retrieves from its storage device HTML code for a first form, and sends this information to the browser executing on remote computer 120. The first form represents the first screen of the legacy application, and is used by the browser to emulate the log-on screen on remote computer 120. The browser displays the first form on display device 214 of remote computer 120.

The user logs into a screen displayed by a browser on display device 214 of remote computer 120 by entering, using keyboard 202, an account ID and a password into the field provide on the form. Once a submit button is depressed, the browser sends user-entered values and their tags from the form as a string, including the account ID and password to network server 110.

Server application 112 receives the string from the form, and extracts the user-entered values. The extracted values, which comprise the account ID and the password, are then passed to message constructor 118, which constructs a message containing those values before the message is sent to application server 100.

Upon receipt of the message by application server 100, the targeted instance of legacy application 102 is then identified by mapper application 106 and message manager application 104 converts the message to the message format employed by the operating system of application server 100. The converted message is then posted to the instance of the legacy application, which sees the message as a normal log-on message in response to a normal keyboard input.

An account details legacy application 102 reacts to the log-on message by presenting the requested bank account details on the display device of application server 100 if the login succeeds.

The account details are then read from the new screen using screen scraping. The account details and the dialog ID of the screen itself are then passed to network server 110. The macro manager on network server 110 identifies the screen of legacy application 102 that corresponds to the received dialog ID, and sends to the browser executing on remote computer 120 information representing a form associated with that screen, together with the data representing the account details. Finally the browser displays the form on the display device of remote computer 120.

Similarly, if the log-on fails, the dialog ID of a log-on failure screen is passed to network server 110. The macro manager on network server 110 sends to the browser executing on remote computer 120 information of a form representing the log-on failure screen. The browser then displays the log-on failure form.

A macro for the above example may have the following structure:

```
<ProcessInterface>
    <DialogID> eg: login screen
            <HandleofWindow>2</HandleofWindow>
        <control > eg: account number
                <control id> yyy </control id>
                <event id/>
        </control >
        <control> eg: account access password
                <control id> yyy2 </control id>
                <event id/>
        </control >
        <control> eg: login button
                <control id> yyy3 </control id>
                <event id> ctrl + O, etc</event id>
        </control >
            <transition info>login button pressed <transition info>
    </DialogID>
    <DialogID> eg: login success
            <HandleofWindow></HandleofWindow>
        <control> eg: account details
                <control id> aaa </control id>
                <event id/>
        </control >
    </DialogID>
    <DialogID eg: login failure>
            <HandleofWindow></HandleofWindow>
        <control> eg: failure reason
                <control id> bbb </control id>
                <event id/>
        </control >
```

-continued
```
    </DialogID>
</ProcessInterface>
```

It may be noted that in the above described arrangement, at various points in the communication processes among remote computer 120, network server 110 and application server 100 the issue is presented of how to map between a legacy application 102 screen and a form. This issue is resolved in a variety of ways in various embodiments of the present invention.

In creating a form for a corresponding screen of legacy application 102, according to one embodiment of the invention, a software developer assigns a unique dialog ID to the form and includes the dialog ID in the HTML code for the form, i.e., the code that a browser uses to render the form. The software developer creates the HTML forms to include unique tags for with each input and output field. In embodiments of the invention without a unique dialog ID for a form, correspondence among inputs and a legacy screen can be determined by unique variable names for inputs. That is, integration object 114 may have variable instances as attributes and a macro may have mapping among the variables to real controls on the legacy screen. Thus mapping among input values and the legacy screen is enabled by this arrangement. Similarly, after communication, output values are set into instance variables of integration object 114.

In various embodiments of the present invention, the following processes or data structures of server 110 are involved in parsing results, including the DialogID, and sending them to the legacy application, as follows. Integration Object 114 is a runnable entity of server 110, in order to avail the services offered by server 110 such as HTTP transport, XML parsers, client session tracking etc. For example, if server 110 is a websphere application server, then runnable entity may be a java class file. Macro manager 116 is a library/bridge between integration object 114, macros and legacy application server 100 providing api's/function to extract information. Integration object 114 uses macro manager 116 for many services such as extracting relevant information from a macro, requesting to communicate (send and receive) to legacy application server 100, etc. A macro may be an XML file representing the screen information of the legacy application. It has information such as the input and output fields on a particular legacy screen and how to trigger the legacy application to process with the given outputs.

In an embodiment of the invention in which the forms are HTML Forms, a server side form handling mechanism is JSP and integration object 114 is Bean, for one particular user request one instance of integration object 114 is created and completes steps 310, 315 and 320 described herein above, which includes saving results for further communication. For instance, a current HTML input form may be as follows:

```
<HTML>
<BODY>
<FORM NAME="Logon" METHOD="POST" ACTION='<%=
response.encodeURL("LogonOutput.jsp")%>">
<LABEL>Userid :
<INPUT type="text" name="userid" VALUE=" ">
</LABEL>
<BR>
<LABEL>Password :
<INPUT type="password" name="password" VALUE="">
```

```
</LABEL>
<BR>
</FORM>
</BODY>
</HTML>
```

According to this embodiment of the invention, process "LogonOutput.jsp" passes on values to integration object 114 on server 110, gets process output from integration object 114, and then creates HTML forms for delivery to remote computer 120. The Logonoutput.jsp program on server 110 may be as follows (wherein comments are embedded between tags "<%--" and "--%>"):

```
<% IOGV.process(request); %>
<jsp:useBean id="Logon" type="IntegrationObject.Logon"
class="IntegrationObject. Logon" scope="request">
<jsp:setProperty name="Logon" property="*"/>
</jsp:useBean>
<%--It sets the values for variables accountnumber and pass-
    word in the integration object. Here the integration object
    name is logon. This is how a JSP will communicate to a
    bean in J2EE. In other cases for Microsoft technologies or
    any other technology it will differ--%>
<% Logon.doHPTransaction(request,response); %>
<%--The function doHPTransaction takes care of performing
    steps 340. The message constructor takes care of steps
    345,350,355 and intimates Integration object about the
    result availability. Integration object takes care of the step
    360--%>
Your Output: <%=Logon.getYourScreen( ) %>
<%--Once the transaction is over, the necessary variable in
    the Integration object will have the results and this filled up
    form will be seen by the user--%>
<BR>
</BODY>
</HTML>
```

Integration object 114 gets values including dialog id, process id, control id, etc., by extracting for a particular variable (accoutnumber and password) from a macro. The variable name is unique so there will not be any confusion. For example, a macro may be as follows:

```
<ProcessInterface>
    <DialogID> eg: login screen
        <HandleofWindow>2</HandleofWindow>
        <control variable="accountnumber"> eg: account number
            <control id> yyy </control id>
            <event id/>
        </control >
        <control variable="password"> eg: account access password
            <control id> yyy2 </control id>
            <event id/>
        </control >
        <control> eg: login button
            <control id> yyy3 </control id>
            <event id> ctrl + O, etc</event id>
        </control >
            <transition info>login button pressed <transition info>
</DialogID>
```

In one embodiment of the present invention, each legacy screen has a unique Dialog ID that was part of the originally developed application and that can be determined by use of an operating system API. A developer creates a form for each screen of a legacy application, such as an HTML file. The developer assigns a unique Dialog ID for each form, so the correspondence between each form and legacy screen can be determined. In one embodiment of the invention, either the Dialog ID for each HTML form is the same as the Dialog ID for the corresponding legacy screen, or else some sort of map showing correspondence between legacy screens and corresponding HTML forms to send to the user is kept on server 110. A user sends a request from remote computer 120 to server 110, including an identifier of a requested legacy application 102. Legacy application 102 inherently has a first screen, such as a logon screen, for example. For example, the legacy application's first screen's Dialog ID may be "logon999." Server 110 gets the HTML file that corresponds to that first screen, either by getting the HTML file with the same Dialog ID as the first legacy screen, or else using its map.

In one such embodiment, the HTML file's Dialog ID may also be "logon999." Server 110 also gets initial data, if the first screen includes some such initial data from legacy application 102. Server 110 may modify the HTML code of the file to add the initial data from the legacy application 102, and then server 110 sends this version of the HTML file, including the initial data, to the user on remote computer 120. The user interacts with the form and ultimately sends results, i.e., text, numbers, or selections, back to server 110 in the form of a string having tags associated therewith, as were defined by the HTML file. That is, the user does not send the form itself back, but rather sends results, i.e., text, numbers, or selections, that arise from the user interacting with the form. Server 110 has to somehow determine that these returned results are for the first form, which, in turn, is for the first legacy screen. In one embodiment of the invention, the Dialog ID, logon999, is included in the HTML file. Accordingly, for this embodiment of the invention, the results returned to server 110 will also include Dialog ID logon999, so server 110 can use the returned Dialog ID logon999 to point the returned results back to the legacy screen of the same Dialog ID. An advantage of the present invention is that the legacy application and associated databases remain unchanged. Inputs and outputs to and from the legacy applications are the only elements affected.

Due to the fact that the legacy application is accessed using messages in the form produced by the native operating system, inputs received over the network are accepted by the legacy application. Also, as the input messages are in the regular form, there is no risk of corrupting the legacy application, nor its associated database(s).

Herein reference is made to forms in a markup language format. It should be understood that such forms may be of any of a variety of types, including HTML forms, XHTML forms and Xforms.

The foregoing describes only some embodiments of the present invention, and modifications and/or changes can be made thereto without departing from the scope and spirit of the invention, the embodiments being illustrative and not restrictive.

What is claimed is:

1. A method for communicating with an application, the method comprising:
  receiving, by a user agent on a user computer, a user request for an application via an application layer protocol and responsively submitting a request to an intermediary computer;
  identifying the application by a server application of the intermediary computer, the identifying being responsive to the user request;
  launching an integration object on the intermediary computer responsive to receiving the request by the intermediary computer, the integration object including a macro manager;
  requesting the application by the server application of the intermediary computer;
  launching an instance of the application by a host computer responsive to the request from the intermediary computer, wherein the application is not configured to interact over a network via an application layer protocol and wherein the launching includes an operating system of the host computer creating a process identifier for the instance of the application;
  sending the process identifier to the intermediary computer by a server module of the host computer;
  retrieving a first form by a macro manager of the intermediary computer and sending the first form to the user agent by the macro manager, wherein the first form emulates a first screen of the application and wherein the sending to the user agent by the macro manager includes sending the process identifier in the first form;
  rendering the first form by the user agent and receiving user input data for the first form by the user agent via an application layer protocol;
  submitting data for the first form by the user agent to the intermediary computer, the data including the user input;
  finding a macro corresponding to the first form by the macro manager of the intermediary computer and extracting the data for the first form by the macro and the macro manager of the intermediary computer, wherein the macro identifies input and output fields for the first screen and how to trigger processing by the legacy application;
  constructing a message containing the process identifier and the extracted data for the first form by a message constructor of the intermediary computer and sending the message to the host computer;
  receiving the message by the host computer and parsing the process identifier from the message by a mapper application of the host computer, wherein an operating system on the host computer is configured to provide messages to applications responsive to hardware input events, the messages being in a predetermined hardware event message format, and wherein the method includes:
  converting the message received from the intermediary computer, wherein the converting is by a message manager application of the host computer using an application programming interface of the operating system and the converting includes converting the message to the predetermined hardware event message format; and
  posting the message in the predetermined hardware event message format to the instance of the application by the message manager application of the host computer responsive to the process identifier extracted from the received form data by the intermediary computer, such that the message appears to the application as if the message is responsive to a hardware input event.

2. The method of claim 1, wherein the request to the intermediary computer includes a dialog identifier, and the retrieving of the first form by the intermediary computer is responsive to the dialog identifier.

3. The method of claim 2, including:
  associating the process identifier and the dialog identifier by the intermediary computer, wherein the information extracted from the received form data includes the user input data and the dialog identifier and wherein the sending of the message to the host computer is responsive to the association of the process identifier and the dialog identifier.

4. The method of claim 1, wherein the method includes:
associating the process identifier and an input field tag of the first form, wherein the information extracted from the received form data by the intermediary computer includes the user input data and the input field tag and wherein the sending of the message to the host computer is responsive to the association of the process identifier and the input field tag.

5. The method of claim 1, wherein the first form is in a mark-up language format.

6. The method of claim 1, wherein the application program interface provides an interprocess communication mechanism for posting messages between applications.

7. A system for communicating with an application, comprising:
a user agent on a user computer;
an intermediary computer, wherein the user agent is configured to receive a user request for an application via an application layer protocol and the intermediary computer is configured to identify the application by a server application and launch an integration object responsive to the user request, the integration object including a macro manager, and wherein the user agent is configured to responsively submit a request for the application to the intermediary computer; and
a host computer including the application and configured to launch an instance of the application responsive to a request from the intermediary computer, wherein the application is not configured to interact over a network via an application layer protocol and wherein the launching includes an operating system of the host computer creating a process identifier for the instance of the application, wherein the host computer is configured with a server module for sending the process identifier to the intermediary computer, wherein the intermediary computer has a macro manager for retrieving a first form for the user agent and sending the first form to the user agent, the first form emulating a first screen of the application and wherein the sending to the user agent by the macro manager includes sending the process identifier in the first form, and the user agent is configured for rendering the first form, receiving user input via an application layer protocol for the first form and submitting data for the first form to the intermediary computer, the data including the user input data, the intermediary computer being configured to find a macro corresponding to the first form by the macro manager and extract the data for the first form by the macro, and the macro manager of the intermediary computer, wherein the macro identifies input and output fields for the first screen and how to trigger processing by the legacy application, the intermediary computer being further configured to construct a message containing the process identifier and the extracted data for the first form by a message constructor of the intermediary computer and sending the message to the host computer, and wherein the host computer is configured to receive the message by the and parse the process identifier from the message by a mapper application of the host computer, wherein an operating system on the host computer is configured to provide messages to applications responsive to hardware input events, the messages being in a predetermined hardware event message format, and the host computer is configured to convert the message received from the intermediary computer, wherein the converting is by a message manager application of the host computer using an application programming interface of the operating system and the converting includes converting the message to the predetermined hardware event message format, the message manager application being configured for posting the message in the predetermined hardware event message format to the instance of the application responsive to the process identifier extracted from the received form data by the intermediary computer, such that the message appears to the application as if the message is responsive to a hardware input event.

8. The system of claim 7, wherein the request for the application to the intermediary computer includes a dialog identifier, and the retrieving of the first form by the intermediary computer is responsive to the dialog identifier.

9. The system of claim 8, wherein the intermediary computer stores an association of the process identifier and the dialog identifier, wherein the information extracted from the received form data by the macro manager of the intermediary computer includes the user input data and the dialog identifier, and wherein the message constructor is configured to send the message to the host computer responsive to the association of the process identifier and the dialog identifier.

10. The system of claim 7, wherein the intermediary computer stores an association of the process identifier and an input field tag of the first form, wherein the information extracted from the received form data by the macro manager of the intermediary computer includes the user input data and the input field tag, and wherein the message constructor is configured to send the message to the host computer responsive to the association of the process identifier and the input field tag.

11. The system of claim 7, wherein the first form is in a mark-up language format.

12. The system of claim 7, wherein the application program interface provides an interprocess communication mechanism for posting messages between applications.

13. A computer program product for communicating with an application, wherein the application is not operable to interact over a network via an application layer protocol, wherein the computer program product resides on a tangible computer readable disk computer readable program code, the program code comprising:
instructions for receiving, by a user agent on a user computer, a user request for an application via an application layer protocol and responsively submitting a request to a intermediary computer;
instructions for identifying the application by a server application of the intermediary computer, the identifying being responsive to the user request;
instructions for launching an integration object on the intermediary computer responsive to receiving the request by the intermediary computer, the integration object including a macro manager;
instructions for requesting the application by the server application of the intermediary computer;
instructions for launching an instance of the application by a host computer responsive to the request from the intermediary computer, wherein the application is not configured to interact over a network via an application layer protocol and wherein the launching includes an operating system of the host computer creating a process identifier for the instance of the application;
instructions for sending the process identifier to the intermediary computer by a server module of the host computer;

instructions for retrieving a first form by a macro manager of the intermediary computer and sending the first form to the user agent by the macro manager, wherein the first form emulates a first screen of the application and wherein the sending to the user agent by the macro manager includes sending the process identifier in the first form;

instructions for rendering the first form by the user agent and receiving user input data for the first form by the user agent via an application layer protocol;

instructions for submitting data for the first form by the user agent to the intermediary computer, the data including the user input;

instructions for finding a macro corresponding to the first form by the macro manager of the intermediary computer and extracting the data for the first form by the macro and the macro manager of the intermediary computer, wherein the macro identifies input and output fields for the first screen and how to trigger processing by the legacy application;

instructions for constructing a message containing the process identifier and the extracted data for the first form by a message constructor of the intermediary computer and sending the message to the host computer;

instructions for receiving the message by the host computer and parsing the process identifier from the message by a mapper application of the host computer, wherein an operating system on the host computer is configured to provide messages to applications responsive to hardware input events, the messages being in a predetermined hardware event message format, and wherein the method includes:

instructions for converting the message received from the intermediary computer, wherein the converting is by a message manager application of the host computer using an application programming interface of the operating system and the converting includes converting the message to the predetermined hardware event message format; and instructions for posting the message in the predetermined hardware event message format to the instance of the application by the message manager application of the host computer responsive to the process identifier extracted from the received form data by the intermediary computer, such that the message appears to the application as if the message is responsive to a hardware input event.

14. The computer program product of claim 13, wherein the request to the intermediary computer includes a dialog identifier, and the retrieving of the first form by the intermediary computer is responsive to the dialog identifier.

15. The computer program product of claim 14, including:

instructions for associating the process identifier and the dialog identifier by the intermediary computer, wherein the information extracted from the received form data includes the user input data and the dialog identifier; and wherein the sending of the message to the host computer is responsive to the association of the process identifier and the dialog identifier.

16. The computer program product of claim 13, wherein the computer program product includes:

instructions for associating the process identifier and an input field tag of the first form by the intermediary computer, wherein the information extracted from the received form data includes the user input data and the input field tag; and wherein the sending of the message to the host computer is responsive to the association of the process identifier and the input field tag.

17. The computer program product of claim 13, wherein the first form is in a markup language format.

18. The computer program product of claim 13, wherein the application program interface provides an interprocess communication mechanism for posting messages between applications.

* * * * *